United States Patent
Dockal

(12) United States Patent (10) Patent No.: US 7,178,283 B1
Dockal (45) Date of Patent: Feb. 20, 2007

(54) FLYING DISK FOR FISHING

(76) Inventor: Craig S. Dockal, 6206 S. Cook St., Centennial, CO (US) 80121

( * ) Notice: Subject to any disclaimer, the term of this patent is extended or adjusted under 35 U.S.C. 154(b) by 0 days.

(21) Appl. No.: 10/213,938

(22) Filed: Aug. 6, 2002

Related U.S. Application Data

(60) Provisional application No. 60/310,606, filed on Aug. 7, 2001, now abandoned.

(51) Int. Cl.
*A01K 91/00* (2006.01)
*A01K 89/08* (2006.01)
(52) U.S. Cl. ............................................ 43/43.11; 43/4
(58) Field of Classification Search .................. 43/4, 43/4.5, 17, 43.11
See application file for complete search history.

(56) References Cited

U.S. PATENT DOCUMENTS

| | | | | | |
|---|---|---|---|---|---|
| 2,122,836 | A | * | 7/1938 | Gegerfeldt | 43/26.1 |
| 4,484,405 | A | * | 11/1984 | Woods | 43/4.5 |
| 4,831,762 | A | * | 5/1989 | Harris | 43/17 |
| 5,044,108 | A | * | 9/1991 | Rinehart | 43/17 |
| 5,222,317 | A | * | 6/1993 | Georgescu | 43/4 |
| 5,253,445 | A | * | 10/1993 | Spoonemore | 43/17 |

* cited by examiner

*Primary Examiner*—Kurt Rowan
(74) *Attorney, Agent, or Firm*—Ramon L. Pizarro; Edwin H. Crabtree

(57) ABSTRACT

A fishing device for use by a person from a fishing location, such as the shore of a lake or river, or the side of a boat or dock is disclosed. The fishing device includes a gliding device having a body having aerodynamic surfaces for lifting the body when tossed by the person, and a tethering connector for tethering the device to the fishing location.

6 Claims, 3 Drawing Sheets

FLYING DISK FOR FISHING

REFERENCE TO RELATED APPLICATIONS

This application claims the benefit of my provisional application having Ser. No. 60/310,606, filed Aug. 7, 2001, now abandoned.

BACKGROUND OF THE INVENTION (a) Field of the Invention

This invention generally relates to a device or system for fishing that uses a flying disk for carrying a fishing hook and line out from the fisherman on to the water. More particularly, but not by way of limitation, a gliding device, such as a flying disk that is tossed out into the water to carry fishing hook and luring bait to a desired location over a body of water.

(b) Discussion of Known Art

The need for a device that can be used to carry or transport a fishing hook or lure to a desired location over water has prompted the development of various devices that can carry the fishing lure. Often, these devices or systems consist of a remote controlled floating device, such as a boat, that operates under remote control. The boat is guided from shore by the fisherman until the boat reaches the location where fish may be hiding. The fisherman then commands the boat to release the bait or lure, so that it may then fall into the water at the location where fish are believed to be in hiding.

These remote controlled systems are complicated, but because they are self-propelled vehicles, they can deliver the bait or lure at a great distance from the fisherman, who is likely to be standing on shore.

SUMMARY

It has been discovered that the problems left unanswered by known art can be solved by providing a fishing device that includes:

a gliding device body having aerodynamic surfaces for lifting the body when tossed by a person;

a connector for tethering the device;

a connector for attaching and supporting a fishing lure or bait.

According to one example of the invention, the gliding device includes a flying saucer, such as the one described in U.S. Pat. No. 3,359,678 to Headrick, incorporated herein by reference. However, it is also contemplated that other devices that can be tossed a great distance when tossed by a person.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

Figure 5:
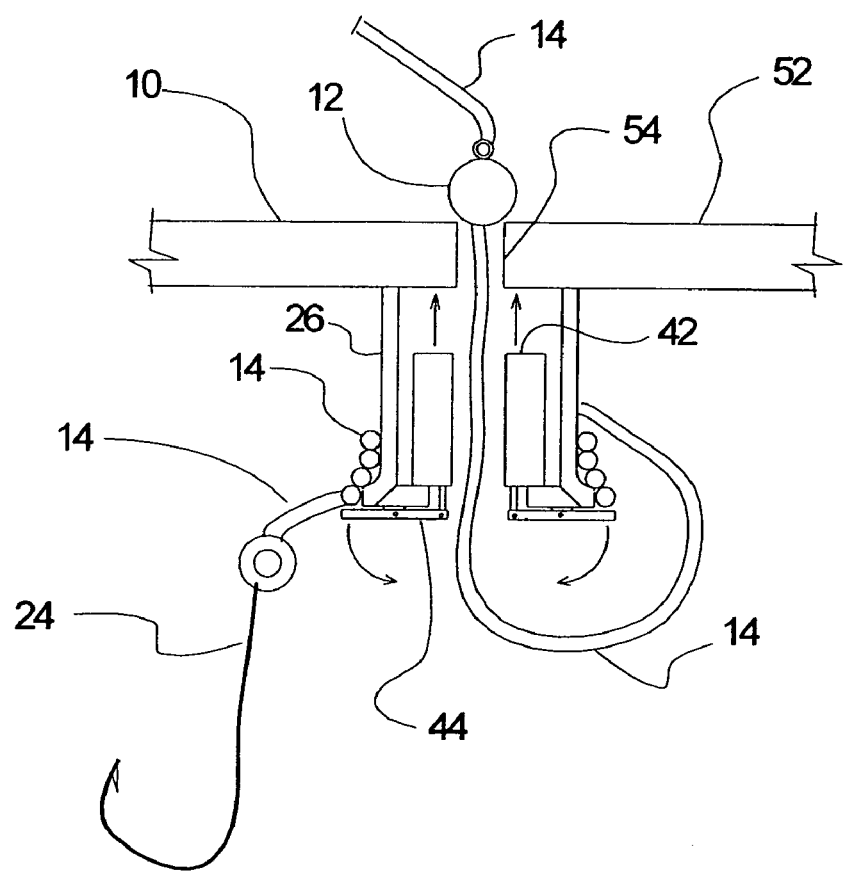

FIG. 5 includes another examples of the line release mechanism.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
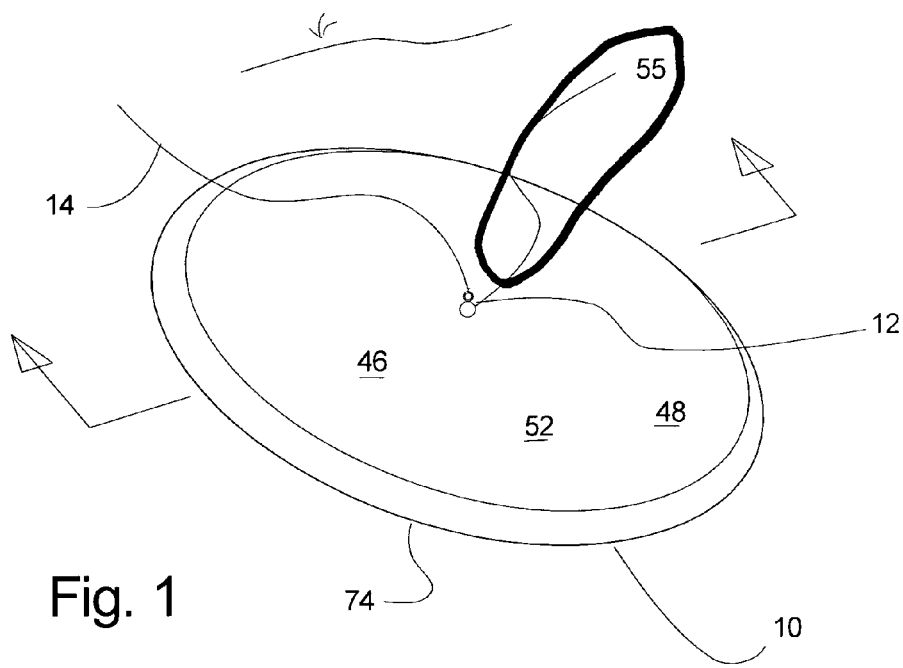
FIG. 1 is a perspective view of an embodiment of the invention.

Turning now to FIG. 1 where a disk 10 has been illustrated using the disclosed inventive concepts. The disk 10 is a flying disk or saucer of the type described in U.S. Pat. No. 3,359,678 to Headrick. It is important to note, that while the illustrated example includes a flying disk such as the Headrick device, it is also contemplated that the invention may be practiced using any one of various tossing devices, such as flying rings, blades, wings and the like. The disk 10 includes a tether connector 12 that allows the user to attach a fishing line 14 to the disk 10. The fishing line 14 may be connected to some sort of reeling device, such as a fishing reel or the like.

Figure 2:
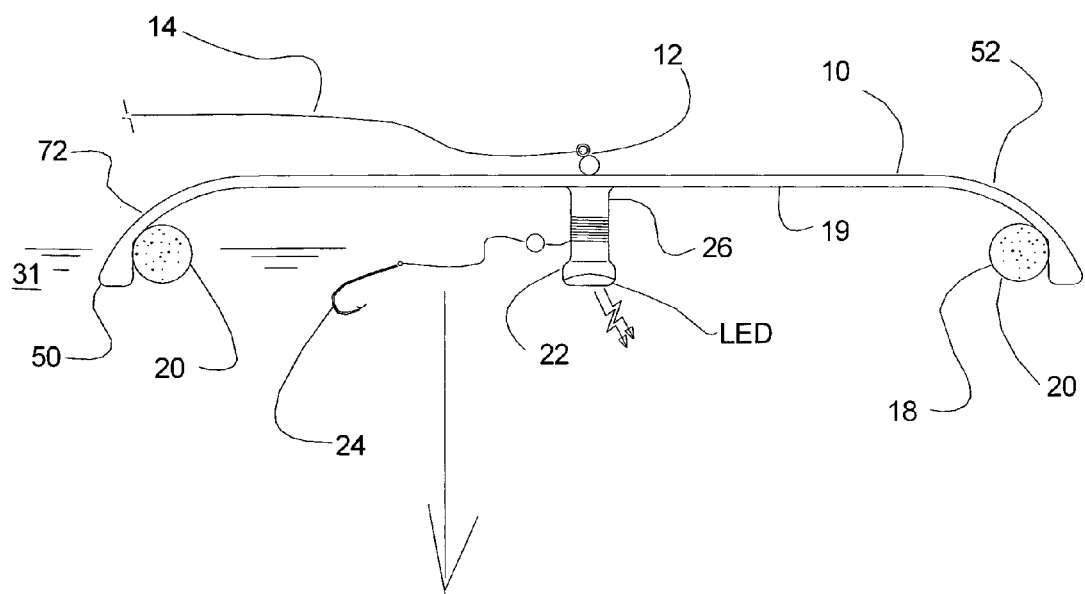
FIG. 2 is a sectional view taken from FIG. 1 along the location indicated on FIG. 1.

Turning to FIG. 2, it will be understood that is also contemplated that a buoyancy-enhancing float 18 may be incorporated into the concave area 19 of the disk 10. The illustrated example uses a foam ring 20 that is attached under the disk 10 to enhance the buoyancy of the device.

Also shown in FIG. 2, is that a connector 22 for attaching and supporting a fishing lure or bait 24 is also mounted on the concave area of the disk, and preferably in the center of the disk 10. The connector 22 may be a simple spool 26, as illustrated, or may incorporate a release mechanism that releases the line once the disk 10 lands on the water. Additionally, as illustrated, it is contemplated that an illumination system, such as an light emitting diode (LED) or glow-in-the-dark, luminescent material may be used as an attachment or as part of the basic material that forms the disk itself.

Still further, it will be understood that a simple spool 26 will allow the user to wind the line in a direction opposite to the direction of spin introduced by the user. Since the disk will spin as it flies, the line will not have an opportunity to unwind until the disk 10 comes to rest on the water.

Additionally, it is contemplated that the device may be tossed with the aid of a tossing arm, as is frequently done when tossing clay pigeons and the like. The tossing arm may be incorporated into a fishing pole type structure, with fishing reel and line, or be separate from the fishing pole or reel.

Figure 3:
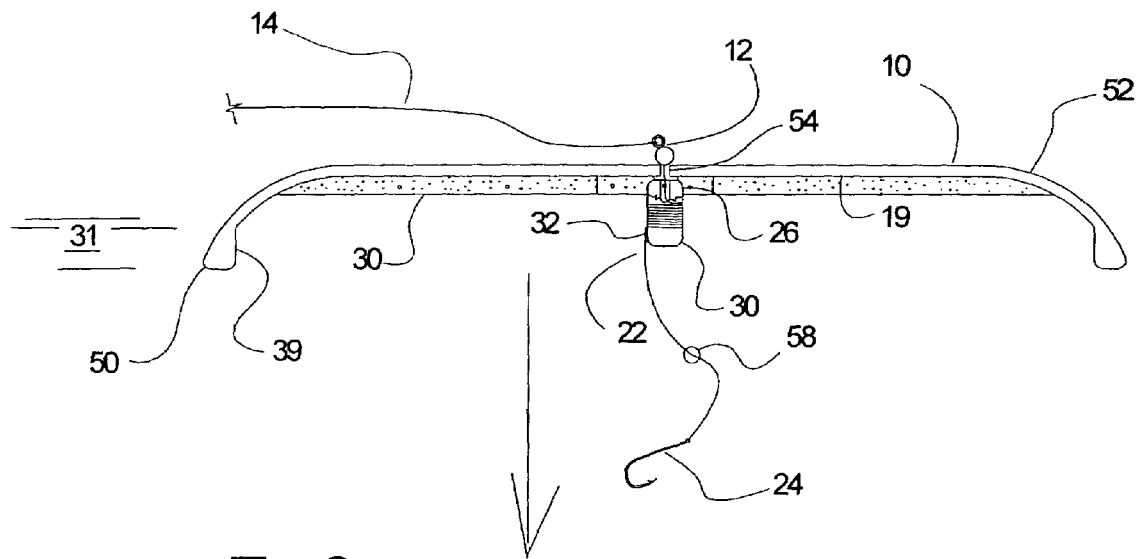
FIG. 3 is a sectional type view similar to FIG. 2, showing an example of the line release and tethering mechanism.

Turning now to FIG. 3, it will be understood that it is contemplated that the disclosed invention may be used with a line release mechanism 30 that releases the fishing line 14 down, under the disk 10 once the disk 10 lands on the water. The example of the release mechanism 30 includes a spool 32 that is supported by a hinge pin 34 from the bottom of the disk 10. The example of the disk illustrated in FIGS. 3–4 includes a foam bottom 36 that allows the disk 10 to float. It is important to note that it is contemplated that the disk 10 may be made from a floating material or incorporate air chambers. Accordingly, the illustrated example merely serves to illustrate the many ways in which the disclosed invention may be practiced.

Figure 4:
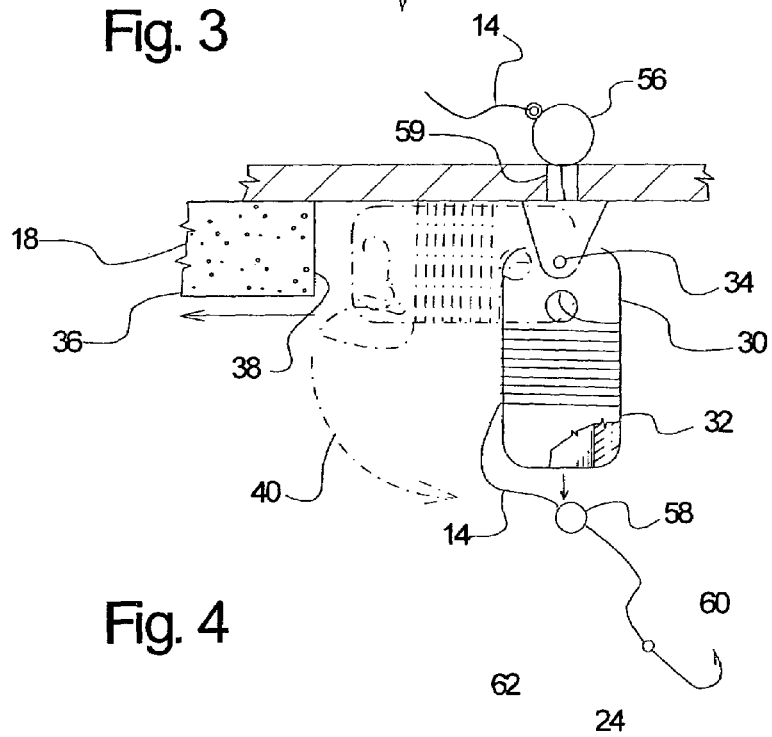
FIG. 4 is an enlarged view of the mechanism shown on FIG. 3.

The release mechanism illustrated in FIGS. 3–4 allows the spool 26 to cooperate with a retaining edge 38 that prevents the fishing line 14 from unwinding from the spool 26 as it travels through the air. The retaining edge 38 may be created as a wall on the foam found in the concave area of the disk, may be defined by the interior edge 39 of the disk 10, provided that the spool is of appropriate length, or may be formed in any other suitable manner that will allow the spool 26 to cooperate with the retaining edge to prevent the fishing line from falling out during flight. The centripetal acceleration imparted on the the generally parallel orientation shown on FIG. 3. However, once the disk 10 comes to rest on the water, the weight of the spool will cause the spool 26 to pivot down as shown by arrow 40 on FIG. 4, allowing the fishing line 14 to fall freely from the spool 26.

It is important to note that it is contemplated that other systems or mechanisms may be used to hold the fishing line 14 on the spool or next to the disk 10 until it is to be dropped into the water. For example, in FIG. 5, a float 42 is used to lift a lever 44 that holds the fishing line 14 on the spool 26. It is also contemplated that an electronic switch that is triggered by a float or the presence of water may also be used to control the release of the fishing line once the disk 10 lands on the water.

Still further, it is important to note that much of the discussion herein has focused on the use of a disk, it is contemplated that the disk 10 serves as a gliding device having a body 46 having aerodynamic surfaces 48 for lifting the body 46 when tossed by a person from a fishing location, such as the shore of a lake or river, or the side of a boat or pier. The aerodynamic surfaces 48 of the body 46 will preferably create an airfoil profile 70 that is part of a circular airfoil 72. The circular airfoil 72 incorporating the airfoil profile 70 within a circular perimeter 74 that bounds a generally convex upper surface 52 and the concave area 19, the concave area 19 and the convex upper surface terminating next to one another about the circular perimeter. Thus, a gliding device such as a boomerang or hand tossed glider may be used. However, there are important advantages to using a disk-shaped device such as the illustrated disk 10. One important advantage is that when retrieving the disk 10, the edges 50 of the disk 10 will be driven into the water, causing the disk 10 to flip over, with the convex surface 52 of the disk to ride over the water. It will be understood that the convex surface 52 of the disk 10 will present very little drag as it is pulled over the water. This will make retrieval easy, even in situations where a fish is being reeled in.

As illustrated in FIGS. 2–4, the fishing line 14 will serve as a tethering connector for tethering the device to the fishing location. It is contemplated that the fishing line 14 will extend through an aperture 54 approximately in the center 55 of the disk 10. A pair of retainers such as the rotating swivel connector 56 that will allow the disk to spin freely once it is tossed, and the lead weight 58 will keep the disk 10 at a desired location along the fishing line 14. Thus, the portion of line between the rotating swivel connector 56 and the end 60 of the fishing line 14 will serve as a bait connector 62 for attaching and supporting a fishing lure 64. It is important to note that the term "fishing lure" as used herein is not intended to be limited to an artificial lure, such as a spoon or fly, but is intended to encompass anything that is used to lure or attract a fish, such as live baits or devices that are simply designed to attract fish.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

I claim:

1. A fishing device for use by a person from a fishing location, the fishing device comprising:
   a flying disk having a body having a homogeneous cross section that is substantially free of cavities and aerodynamic surfaces that create an airfoil profile for creating aerodynamic lift, the airfoil profile, which also bounds the homogeneous cross section, comprising a generally convex upper surface that includes a center location and terminates at an edge and a concave area below the convex upper surface to produce aerodynamic lift when the flying disk is tossed with a spinning motion, the concave area terminating in an interior edge that is uniformly offset from the edge of the convex upper surface, the concave area and the convex upper surface terminating next to one another about the edge for lifting the body when tossed by the person;
   a foam section attached to the concave area of the flying disk, the foam section being offset from the edge and providing sufficient buoyancy so that the solid body will float on water;
   a spool with a bait connector is attached to the disk though a hinge that allows the spool to pivot from a first position where the spool cooperates with a retaining edge in the concave area of the disk to retain the bait connector to a second position where the spool extends away from the concave area, allowing the bait connector to fall from the spool; and
   a tethering connector for tethering the device to the fishing location, the tethering connector being attached to the convex portion at the center location of the convex portion, so that the disk rotates about the tethering connector when tossed.

2. A fishing device according to claim 1 wherein said flying disk has been adapted for use with a throwing arm.

3. A fishing device according to claim 1 wherein said flying disk has been adapted for gliding due to a lift force.

4. A fishing device for tossing by a person from a fishing location, the fishing device comprising:
   a disk having a solid plastic body having a homogeneous cross section that is substantially free of cavities and aerodynamic surfaces for lifting the body when tossed by the person, the aerodynamic surfaces being defined, and the homogeneous cross section being bounded by, a circular airfoil for creating aerodynamic lift, the circular airfoil, which also bounds the homogeneous cross section, defined by an edge that bounds a generally convex upper surface and a concave area, the concave area terminating in an interior edge that is uniformly offset from the edge of the convex upper surface, the concave area and the convex upper surface terminating next to one another;

a tethering connector for tethering the device to the fishing location, the tethering connector being attached to the convex portion at the center location of the convex portion, so that the disk rotates about the tethering connector when tossed;

a foam section attached to the concave area, the foam section being offset from the interior edge and providing sufficient buoyancy so that the solid body will float on water; and a bait connector for attaching and supporting a fishing lure within the concave area, the bait connector being mounted from a spool that is attached to the disk though a hinge that allows the spool to pivot from a first position where the spool cooperates with a retaining edge in the concave area of the disk to retain the bait connector, to a second position where the hollow spool extends away from the concave area, allowing the bait connector to fall from the spool.

5. A fishing device according to claim 4 wherein said flying disk has been adapted for use with a throwing arm.

6. A fishing device according to claim 4 wherein said spool is hollow and adapted for retaining the bait connector within the hollow spool.

* * * * *